United States Patent [19]

Simpson

[11] 4,173,397
[45] Nov. 6, 1979

[54] SOLAR CONCENTRATOR

[75] Inventor: John G. Simpson, Huntsville, Ala.

[73] Assignee: The United States of America as represented by the Administrator of the National Aeronautics and Space Administration, Washington, D.C.

[21] Appl. No.: 856,465

[22] Filed: Nov. 30, 1977

[51] Int. Cl.² .............................................. G02B 5/10
[52] U.S. Cl. ................................... 350/295; 126/438; 350/296; 126/442
[58] Field of Search ...................... 350/293, 295, 296; 313/315; 126/270, 271

[56] References Cited

U.S. PATENT DOCUMENTS

| | | | |
|---|---|---|---|
| 1,951,404 | 3/1934 | Goddard | 350/295 X |
| 3,906,927 | 9/1975 | Caplan | 350/295 X |
| 4,056,309 | 11/1977 | Harbison et al. | 350/293 X |
| 4,103,672 | 8/1978 | Meyer | 126/270 |
| 4,106,484 | 8/1978 | Dame | 350/295 X |
| 4,119,365 | 10/1978 | Powell | 350/295 X |

Primary Examiner—F. L. Evans
Attorney, Agent, or Firm—Joseph H. Beumer; John R. Manning; Leon D. Wofford, Jr.

[57] ABSTRACT

An improved solar concentrator characterized by a plurality of elongated supporting members arranged in substantial horizontal parallelism with the axis thereof intersecting a common curve and a tensioned sheet of flexible reflective material disposed in engaging relation with the supporting members for imparting to the tensioned sheet a catenary configuration.

4 Claims, 6 Drawing Figures

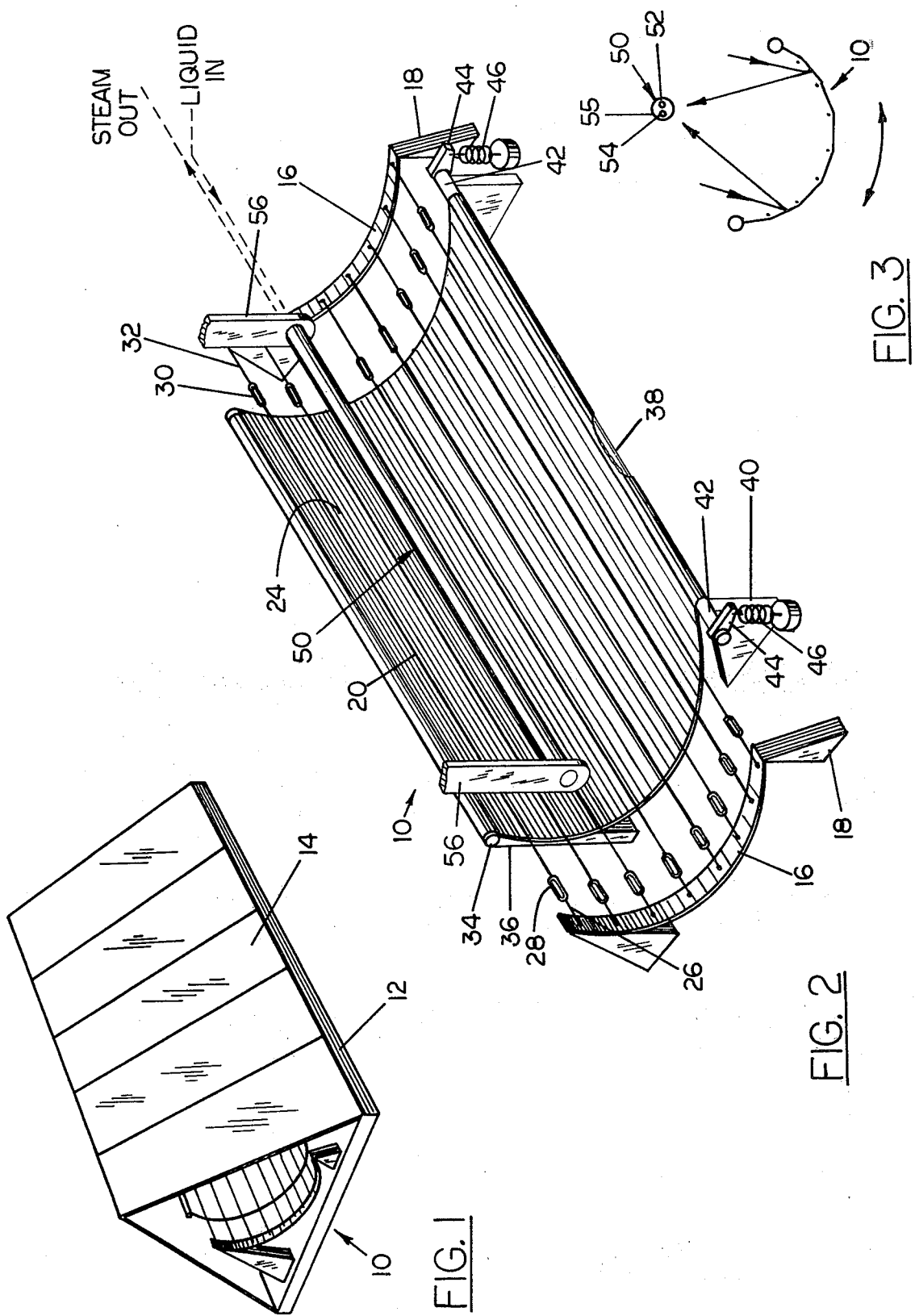

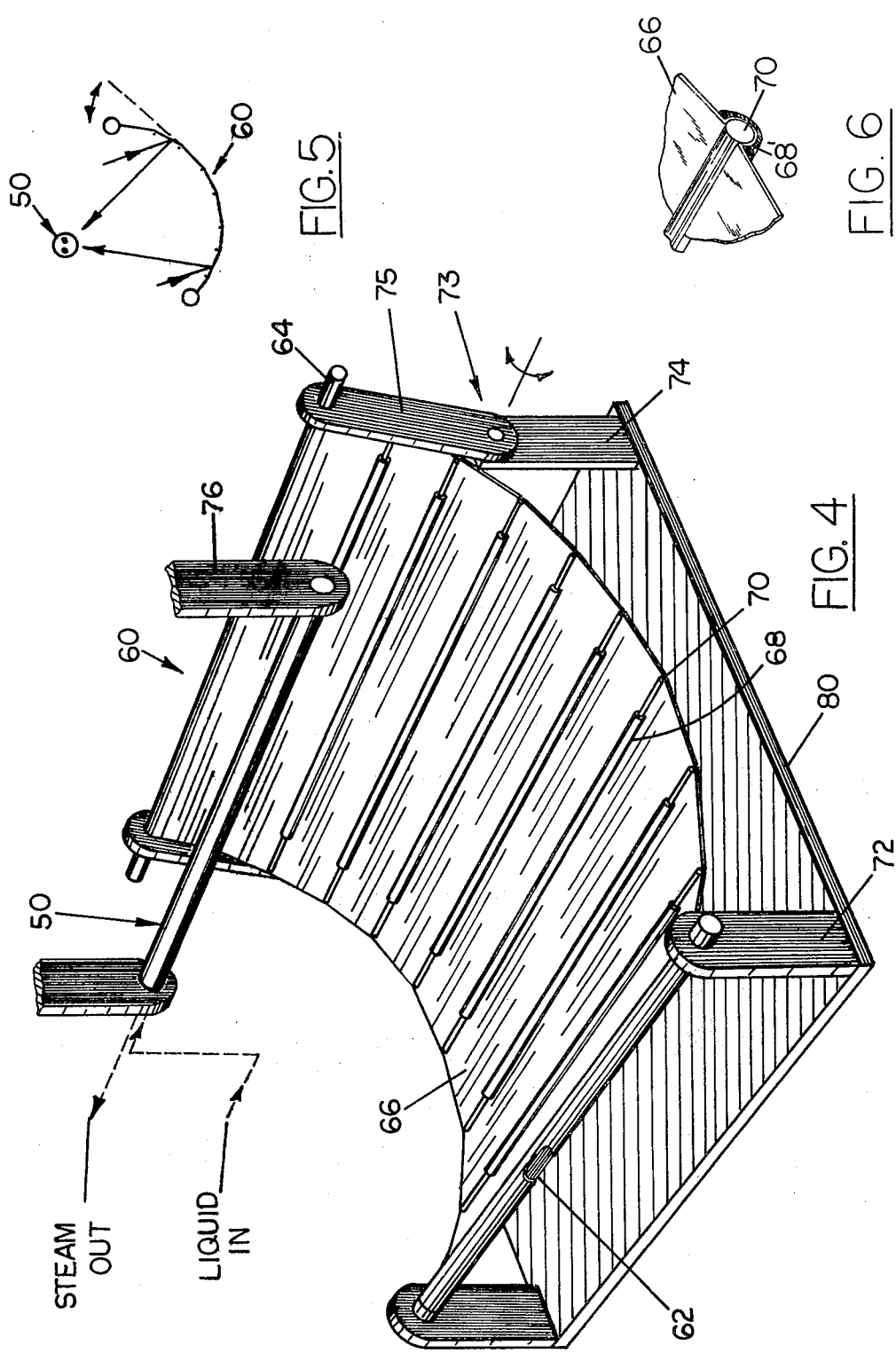

SOLAR CONCENTRATOR

ORIGIN OF THE INVENTION

The invention described herein was made by an employee of the United States Government and may be manufactured and used by or for the Government or governmental purposes without the payment of any royalties thereon or therefor.

BACKGROUND OF THE INVENTION

1. Field of the Invention

The invention relates generally to solar concentrators and more particularly to an improved solar concentrator which is economic to fabricate, simple to employ and efficient in operation.

2. Description of the Prior Art

In the fabrication of solar heaters, a use of trough-like reflectors for reflecting incident solar energy towards collectors located generally along the focal axes of the collectors is well known. Generally speaking, however, such reflectors include accurately ground mirrors and/or highly polished metallic surfaces which are expensive to fabricate, heavy and generally difficult to employ. For example, it is known that the power of a collector is a function of its area, consequently, it can be appreciated that the use of accurately ground and/or highly polished surfaces in the fabrication of collectors tend to render practical solar concentrators relatively expensive in terms of construction and fabrication costs. Further, solar heaters which utilize tracking light reflectors tend to be characterized by excessive mass and bulk and, therefore, tend to be impracticable for use in buildings such as dwellings and the like. Of course, the complexity of solar heaters is further increased in those instances where attempts are made to "fine tune" the reflecting surfaces of solar concentrators, as is clearly evidenced by the teachings of U.S. Pat. No. 3,906,927 which issued to Harry W. Kaplan, Sept. 23, 1975.

As can readily be appreciated by all those familiar with the design and fabrication of solar heaters adapted to employ trough-like concentrators for reflecting incident solar energy toward an energy collector, such as a fluid conduit or the like, there currently exists a need for a simple, low cost and practical solar concentrator having a capability of being readily installed and simply employed for facilitating expansive utilization of solar energy.

It is therefore the general purpose of the instant invention to provide a practical and economic solar concentrator particularly adapted to be employed for focusing incident solar energy on an energy collector.

OBJECTS AND SUMMARY OF THE INVENTION

It is therefore an object of the instant invention to provide an improved solar energy concentrator.

It is another object to provide an improved solar energy concentrator which overcomes the aforementioned difficulties and disadvantages.

It is another object to provide an improved, lightweight and economical solar energy concentrator capable of fulfilling existing needs, particularly in the home building industry.

It is another object to provide an improved solar energy concentrator of a catenary configuration.

It is another object to provide an improved solar energy concentrator which includes a flexible sheet supported in parabolic or other concentrating configuration by a plurality of rods or variably tensioned wires.

It is another object to provide in a solar energy concentrator a flexible reflective sheet supported in a parabolic configuration by a plurality of rods extended in parallelism and connected with the sheet in a supported relationship therewith.

It is another object to provide in a solar energy collector an improved concentrator particularly suited for use in converting solar energy to heat, although not necessarily restricted in use thereto since the concentrator of the instant invention may be employed equally as well in a system adapted to convert solar energy to electrical energy.

These and other objects and advantages are achieved through the use of a solar energy concentrator comprising a flexible sheet of a generally parabolic configuration as will hereinafter become more readily apparent by reference to the following description and claims in light of the accompanying drawings.

BRIEF DESCRIPTION OF THE DRAWINGS

FIG. 1 is a pictorial view illustrating a roof top within which is supported a solar energy concentrator embodying the principles of the instant invention.

FIG. 2 is a perspective view of one embodiment of the solar concentrator.

FIG. 3 is a diagrammatic end view of the concentrator.

FIG. 4 is a perspective view of another embodiment of the instant invention.

FIG. 5 is a diagrammatic end view of the other embodiment.

FIG. 6 is an enlarged, partially sectioned view of still another embodiment of the invention.

DESCRIPTION OF THE PREFERRED EMBODIMENTS

First Form

Referring now to the drawings wherein like reference characters designate like or corresponding parts throughout the several views, there is shown in FIG. 1 a concentrator, generally designated 10, which comprises one embodiment of the instant invention.

As shown in FIG. 1 the concentrator 10 is mounted in a structure 12 comprising a roof-like configuration. The structure 12, as shown, includes transparent panels 14 suitably supported in protective relation with the concentrator 10. While as a practical matter, the panels 14 are formed of glass, it is to be understood that since the structure 12 forms no specific part of the instant invention, the details thereof are omitted in the interest of brevity. However, it also is to be understood that the concentrator 10 is particularly suited for use in the construction of homes and similar buildings and structures.

Referring now to FIG. 2, wherein the concentrator 10 is shown with more particularity, it can be seen that the concentrator 10 includes a pair of arcuate base members, designated 16 mounted on suitable supports 18 disposed in mutually spaced relation. As shown, the base members 16 generally conform to a parabolic curve in order to assure that the cross sectional configuration of the concentrator 10 generally conforms to a parabolic configuration. However, as will hereinafter become more readily apparent, fine tuning of the concentrator 10 is provided for so that increased efficiency in the operation of the concentrator may be realized.

Extended between the base members 16 are a plurality of tensioned wires 20. These wires preferably are formed of high-grade steel or the like in order to reduce the likelihood that the tension in the wires will dissipate over long period of use. The wires 20 are arranged in uniformly spaced parallelism and provide a structural frame about which a flexible sheet 22 having a reflective surface 24 is drawn taut, as illustrated in FIG. 1. Rigid rods could be used in place of wires 20.

The wires 20 are connected at their first ends to one of the base members 16 employing a plurality of uniformly spaced anchor pins 26. These pins are extended horizontally from the base member and are threaded into a turnbuckle 28. Each of the turnbuckles 28 also serves to receive in a coupled relationship a threaded pin united with one end of one of the wires 20.

The second or opposite end of each of the wires 20 is similarly coupled through a turnbuckle 30 and anchor pin 32 to the other base member 16. Hence, it should be understood that the tension for the various wires 20 may readily be varied by adjusting the turnbuckles 28 and 30 in order to effect a change in the configuration 10. The configuration is changed for achieving fine tuning of the concentrator as the curvature of the surface is altered to one which facilitates a substantially precise focusing of reflected incident radiation.

The sheet 22 is formed of a flexible material having a reflective surface. Such a material comprises aluminized Mylar. The sheet preferably is connected along a first edge thereof to an elongated support bar 34 mounted on mutually spaced, vertical supports 36. The second or opposite edge of the sheet 22 is connected to a bar 38 rotatably mounted on a pair of mutually spaced supports 40. As a practical matter, a bearing sleeve 42 provided at each of the opposite ends of the bar 38 and affixed to the supports 40 serves to accommodate rotary motion of the bar 38 about its longitudinal axis. Moreover, the bar 38 is, where desired, provided at each of its opposite ends with a lever arm 44 through which torque is applied to the bar 38 for controlling the tension in the sheet 22. A pair of tension springs 46 connected with the lever arms 44 is provided to support the sheet 22 in a uniformly tensioned condition. Thus the sheet 22 is continuously supported in a parabolic configuration, the curvature thereof being dictated by the effects of the tension in sheet, at least in part.

Mounted along a line of focus for the concentrator 10 is a collector 50. As shown in FIG. 3, the collector 50 includes a pair of conduits 52 and 54 arranged in a side by side relationship, preferably within a transparent jacket 55.

As can readily be appreciated by those familiar with the fabrication and installation of solar heaters and similar devices, one of the conduits of the pair designated 52 and 54 serves to introduce a cool liquid, preferably water, into the collector 50 while the other conduit of the pair serves to discharge a heated fluid, preferably heated vapor or steam, from the collector 50.

Of course, fluids other than water can be employed for this purpose. Moreover, the collector 50 can be adapted to convert solar energy to electrical energy directly through a use of solar cells and the like.

Consequently, since the collector 50 forms no specific part of the instant invention, a detailed description thereof is omitted in the interest of brevity. However, it is important to note that, as shown, the collector 50 is supported in suspension by a pair of pivotal arms 56. These arms are coupled to a suitable actuator, not shown, which serves to displace the collector 50 relative to the concentrator 10. Thus a repositioning of the collector relative to the focus of the reflective surface 24 of the sheet 22 is facilitated for enhancing efficiency of the system.

Additionally, in order to accommodate a change in the seasons, where desired, the concentrator 10 is so supported, by means not shown, that displacement thereof along an arcuate path is facilitated. Again, since the particular structure employed in accommodating a displacement of the concentrator 10 forms no specific part of the instant invention, a detailed description thereof is omitted in the interest of brevity. However, it should be apparent that repositioning of the concentrator is, where desired, achieved through a use of simple structure including curved tracks and the like adapted to receive and maintain the supports 18 and 40 at various locations along an arcuate path. Of course, the utility of the concentrator 10 is not limited to "tracking" systems since the concentrator may be employed equally as well in so-called "passive" solar concentrator systems wherein the concentrator remains stationary, and no provision is made for tracking the sun.

Second Form

The embodiment of the invention depicted in FIGS. 4 and 5 of the drawings is provided with the same basic structural components as described in connection with the embodiment illustrated in FIGS. 1, 2 and 3. Therefore, it is to be understood that corresponding elements are similarly numbered in FIGS. 4 and 5.

As shown in FIGS. 4 and 5, a concentrator of a catenary configuration, generally designated 60, is provided for focusing instant radiation on the external surface of the collector 50. The concentrator 60 is similar in design and function to the collector 50 previously described. The concentrator 60, however, includes a pair of suspension bars 62 and 64 arranged in spaced parallelism. Between these bars there is suspended a flexible sheet 66. This sheet includes a reflective surface, not designated, similar to the reflective surface 24 of the flexible sheet 22. Preferably, the sheet 66 also is fabricated from aluminized Mylar and includes along its surface a plurality of uniformly spaced, transversely oriented tubular receptacles 68 bonded to sheet 66 through the use of a suitable adhesive. These receptacles are provided for receiving therein rods 70 which function simply as weights for tensioning the sheet 66. Hence, it will be appreciated that by changing the mass of the rods the tension within the sheet 66 is varied. Of course, the curvature of the sheet will vary in response to changes in tension. Thus a fine tuning of the concentrator 60 is facilitated.

In practice, the suspension bar 64 is supported by a pair of mutually spaced pillars 73 disposed at the opposite ends of the bar 62, while the suspension bar 64 is mounted at the uppermost end of an articulated pillar 73 including pivotally coupled segments 74 and 75. The articulation of the pillar 73 accommodates a selective repositioning of the bar 64 for facilitating changes in the curvature of the concentrator 60. It will be appreciated, of course, that the joint established between segments 74 and 75 is provided with suitable structure, not shown, adapted to maintain a fixed angular relationship between the segments.

Additionally, it should be noted that the collector 50 also is supported for displacement by a pair of pivotal arms 76, similar in design and function to the arm 56.

Hence, it is to be understood that the position of the collector 50 selectively may be varied for enhancing the efficiency of the concentrator 60 simply by displacing it along an arcuate path. Finally, it is noted that a suitable base 80, of a suitable configuration is provided for supporting the concentrator 60.

As depicted in FIG. 6, the rods 70 are, where so desired, connected to sheet 66 through a use of modified tubular receptacles, designated 68. These receptacles comprise tubular bodies, characterized by a spring constant, split longitudinally and placed over the rods with the sheet disposed therebetween, so as to unite the sheet and rod in a clamping action.

OPERATION

It is believed that in view of the foregoing description, the operation of the device will readily be understood. However, in the interest of providing for a complete understanding of the invention the operation thereof will, at this point, be reviewed briefly.

With regard to the concentrator 10, mounted within a structure 12, it is prepared for operation simply by establishing therefor a desired pitch or elevational orientation and thereafter effecting a fine tuning thereof. The fine tuning is achieved by tensioning the wires 20 and the sheet 22 sufficiently for focusing incident radiation at the axes of the collector 50. Of course, the collector 50 is repositioned to assure that its axis assumes a position along a line of focus for the concentrator. As solar energy passes through the transparent panels 14 it is reflected by the surface of the surface 24 of the sheet 22 to impinge on the external surface of the collector 50 for purposes of heating a suitable fluid circulating therethrough.

With reference to FIGS. 4 and 5, the concentrator 60 is prepared for operation by repositioning the sheet 66 to an optimum elevation. With the rods 70, of a suitable weight, prepared for operation by repositioning the sheet 66 to an optimum elevation. With the rods 70, of a suitable weight, inserted into the receptacles 68 the segments 75 of the segmented pillars 73 are tilted, with respect to the axis of the segment 74, for imparting a desired curvature to the sheet 66. The curvature must be suitable for achieving a desired focus of incident solar energy along a line coincident with the longitudinal axis of the collector 50. Of course, the collector 50 also is displaced along an arcuate path to the line of focus simply by displacing the segment 76. Hence, as illustrated in FIG. 5, solar radiation incident on the surface of the concentrator 60 is reflected to impinge on the collector 50.

In view of the foregoing, it should be apparent that the present invention provides a practical solution to the perplexing problem of providing a simple, economic and efficient concentrator particularly suited for use by those engaged in the design and construction of buildings such as dwellings and the like.

I claim:

1. In a solar concentrator, the improvement comprising:
   A. a plurality of tensioned wires extended between a pair of arcuate base members for forming a frame of an elongated concave configuration, said wires being arranged in parallel with the axes thereof extended into intersecting relation with a common curve defined by said base members; and
   B. a thin film of aluminized Mylar drawn taut over the frame with a reflective surface thereof assuming an elongated catenary configuration consistent with the configuration of the frame.

2. The improvement of claim 1 further comprises means for varying the configuration of the sheet including a plurality of turnbuckles anchored to the base members and connected with said wires for varying the tension thereof.

3. The improvement of claim 2 further comprising means for varying the tension of the sheet including a rotatable support bar connected to the sheet along one edge thereof and a tension spring connected to the bar for establishing a moment about the axis thereof.

4. The improvement of claim 3 further comprising an arm projected radially from said support bar interconnecting said spring and the bar.

* * * * *